March 3, 1959 — G. C. EKOLA — 2,875,968
CHRISTMAS TREE STAND
Filed Oct. 4, 1954
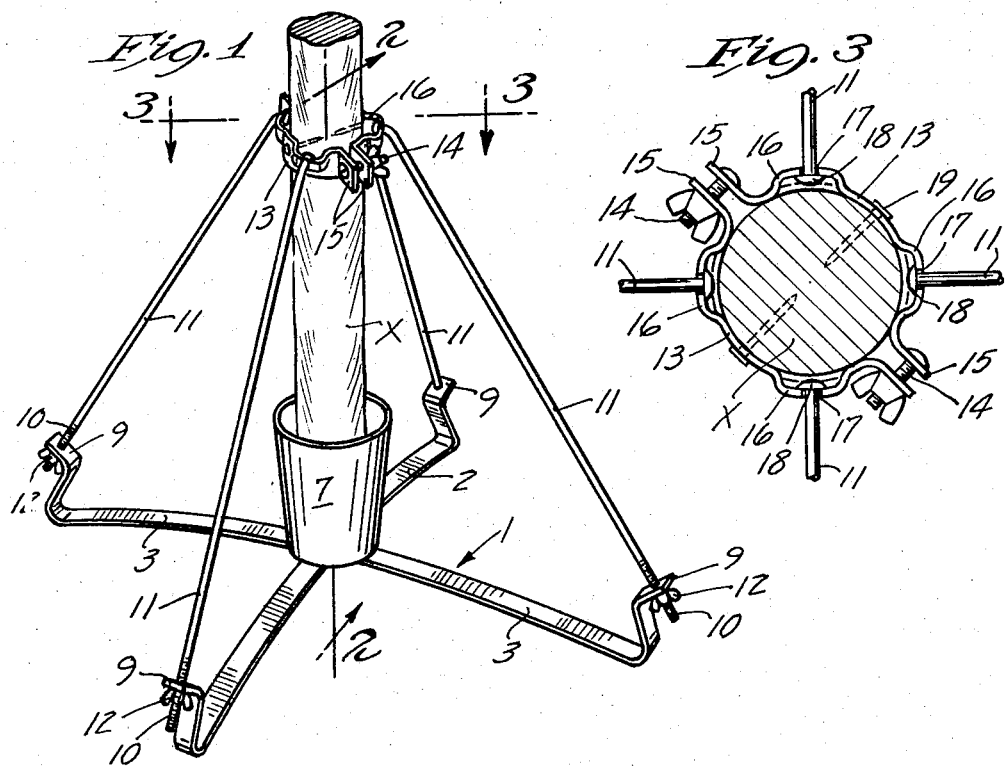
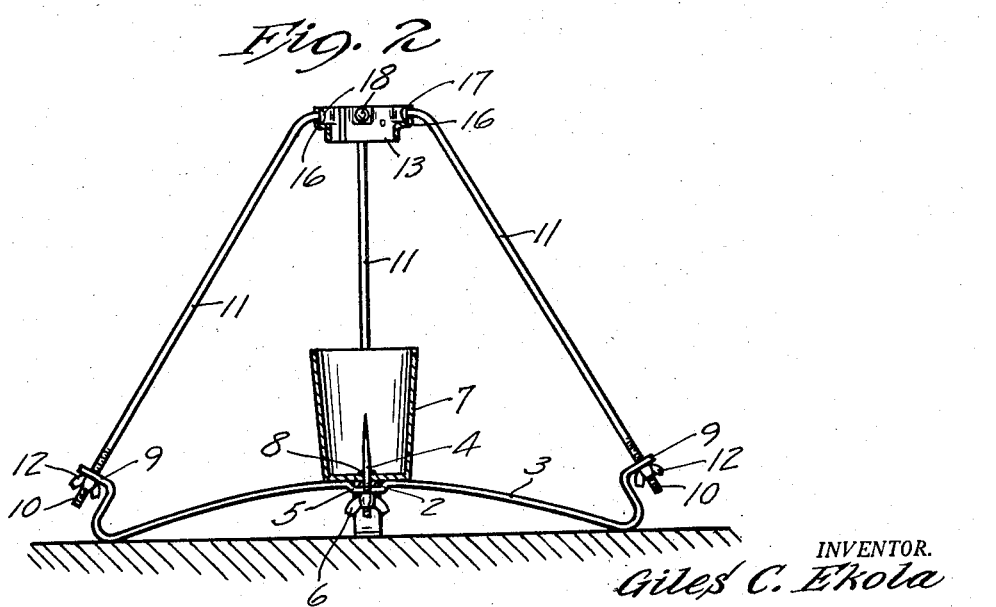
INVENTOR.
Giles C. Ekola
BY
Merchant & Merchant
ATTORNEYS

United States Patent Office 2,875,968
Patented Mar. 3, 1959

2,875,968

CHRISTMAS TREE STAND

Giles C. Ekola, New York Mills, Minn.

Application October 4, 1954, Serial No. 460,103

1 Claim. (Cl. 248—48)

My invention relates to improvements in holders for Christmas trees and the like and has for its object provision of novel and inexpensive means whereby the trunk of the tree may be quickly adjusted with respect to the vertical.

A still further object of my invention is the provision of a device of the class above described which is inexpensive to produce, which is durable in construction, which holds a tree securely and free from rocking and which is readily adjustable.

A still further object of my invention is the provision of a device of the class above described which is provided with means for readily centering and for watering the tree trunk while same is retained therein.

A still further object of my invention is the provision of a device of the class described which has a minimum of parts and which may be readily taken apart and shipped or stored in a minimum of space.

The above and still further objects of my invention will become apparent from the following detailed specification, appended claim and attached drawings.

Referring to the drawings wherein like characters indicate like parts throughout the several views:

Fig. 1 is a perspective view illustrating my novel device with a tree trunk held therein;

Fig. 2 is a view partly in side elevation and partly in section taken on the line 2—2 of Fig. 1; and Fig. 3 is an enlarged transverse section taken on the line 3—3 of Fig. 1.

Referring with greater particularity to the drawings, the numeral 1 indicates in its entirety a base element comprising a pair of substantially longitudinally upwardly bowed elongated base members or bars 2 and 3 preferably formed from metal straps which are pivotally secured together at their intermediate portions by a pivot pin 4. As shown in Fig. 2 the base bar 3 is bent at its center to provide a U-shaped saddle 5 for the snug reception of the base bar 2 when same are moved to the right angular tree supporting positions of Figs. 1 and 2. At its lower end the pivot pin 4 is threaded and provided with a wing nut 6 for locking the said base bars in their operative or inoperative positions. The pointed upper end of the pivot pin 4 projects upwardly through the bottom of a cup-like receptacle 7 which provides a receiving and centering means for the base of a tree trunk X. The upper end of the pivot pin 4 is made fast to the receptacle 7 by means of welding or the like, as indicated at 8, which also makes said receptacle water-tight. Also and as shown particularly in Fig. 2, the base bars 2 and 3 are bowed intermediate their free ends to vertically space the threaded lower end of the pivot pin 4 and wing nut 6 from the ground. The outer free ends of the base bars 2 and 3 are bent upwardly and outwardly to provide attachment ears 9. Attachment ears 9 are apertured to receive the threaded lower ends 10 of rod-like brace or supporting legs or braces 11 which are circumferentially spaced when the base bars 2 and 3 are in their right angular operative positions of Figs. 1 and 2. The threaded lower ends 10 of the legs 11 are provided with a removable-adjustable securing means such as wing nuts 12 which bear against the under surface of the attachment ears 9.

Adapted to be secured to the tree trunk X upwardly from the base bars 2 and 3 is a clamping collar 13, preferably and as shown comprising semi-circular sections which may be drawn together by nut-equipped bolts 14 passing through aligned openings in parallel clamping tongues 15 on opposite ends of the sections 13. Preferably and as shown each of the clamping collar sections 13 is provided with a pair of circumferentially spaced radially outwardly flared upwardly opening portions or pockets 16. Pockets 16 are in turn provided with upwardly opening notches 17 for the detachable reception of the upper end portions of the legs 11. At their extreme upper ends the legs 11 are provided with enlarged heads 18 which prevent the legs 11 from being unseated from the notches 17 under downward pressure upon the legs 11 exerted thereupon through the medium of the wing nuts working upon the attachment ears 9.

When it is desired to utilize my structure for supporting a Christmas tree or the like, the trunk X is placed in the receptacle 7 and centered on the pointed pivot pin 4. A desired amount of water may be introduced into the receptacle 7 from time to time to keep the tree moist. The clamping collar sections 13 are then placed about the trunk X at a given level above the receptacle 7. The upper end of the legs 11 are then caused to be received within the notches 17 in the pockets 16 with the heads 18 thereof received within said pockets. The threaded lower ends of the legs 11 are caused to pass through the apertures in the attachment ears 9 and the wing nuts 12 threaded over the lower ends 10. At this point the clamping collar may be rigidly secured to the trunk X either through the medium of tightening the thumb-nut equipped bolts 14 or by passing nails or the like 19 transversely through openings, not numbered, in the clamping collar sections 13, as shown in Figs. 1 and 3. Obviously, both of these steps may be followed if found necessary or desirable. Thereafter, adjustment of the wing nuts 12 on the threaded lower end 10 of the legs 11 will not only bring about the desired supporting tension between the collar sections 13—13 and the base 1, but also will impart the desired vertical adjustments to the trunk X. Furthermore, should the trunk X shift for one reason or another, or become warped while being supported in my novel holder, vertical adjustments may be imparted thereto by varying the length of one or more of the supporting legs 11 through the medium of wing nuts 12.

When it is desired to ship or store my novel structure, the base bars 2 and 3 may be longitudinally aligned with each other, the collar sections 13 detached and placed within the receptacle 7 and the legs 11 removed from the apertures in the attachment ears 9, and also longitudinally aligned with the base bars 2 and 3. A very small, compact bundle may thus be achieved.

My invention has been tested and found to be completely satisfactory for the accomplishment of the above objects, and while I have shown a preferred embodiment thereof, same is capable of modification without departure from the scope and spirit of the appended claim.

What I claim is:

In a tree stand of the class described, a plurality of generally horizontally disposed substantially longitudinally upwardly bowed elongated base members, means pivotally connecting said base members together adjacent the longitudinal central portions thereof, a trunk-receiving cup carried by the central portions of the base members, the end portions of each base member being disposed generally upwardly and having an aperture therein defining an attachment ear, an elongated brace disposed within the aperture of each attachment ear and extending generally upwardly therefrom, a removable-adjustable securing means carried by the lower ends of each brace and an enlarged head adjacent the upper end thereof, a split annular clamping collar, and means positioning said collar in generally vertically spaced aligned relationship to the cup to enable the collar to encompass a tree trunk positioned in the cup in upwardly spaced relationship thereto, said means comprising a plurality of circumferentially spaced radially outwardly flared portions on said collar, each of said portions having a generally upwardly opening notch therein receiving one of the upper ends of the braces adjacent to the enlarged head, said notches being of such size as to preclude the passage of the respective enlarged head therethrough.

References Cited in the file of this patent

UNITED STATES PATENTS

| | | |
|---|---|---|
| 923,206 | Singleton | June 1, 1909 |
| 1,131,477 | Grofoot | Mar. 9, 1915 |
| 1,210,932 | Halliday | Jan. 2, 1917 |
| 1,546,314 | Prince | July 14, 1925 |
| 1,772,693 | Van Dorin | Aug. 12, 1930 |
| 2,444,390 | White | June 29, 1948 |
| 2,518,421 | Freel | Aug. 8, 1950 |